SYNCHRONIZING CIRCUIT FOR A RECEIVING DISTRIBUTOR
Filed Nov. 2, 1965
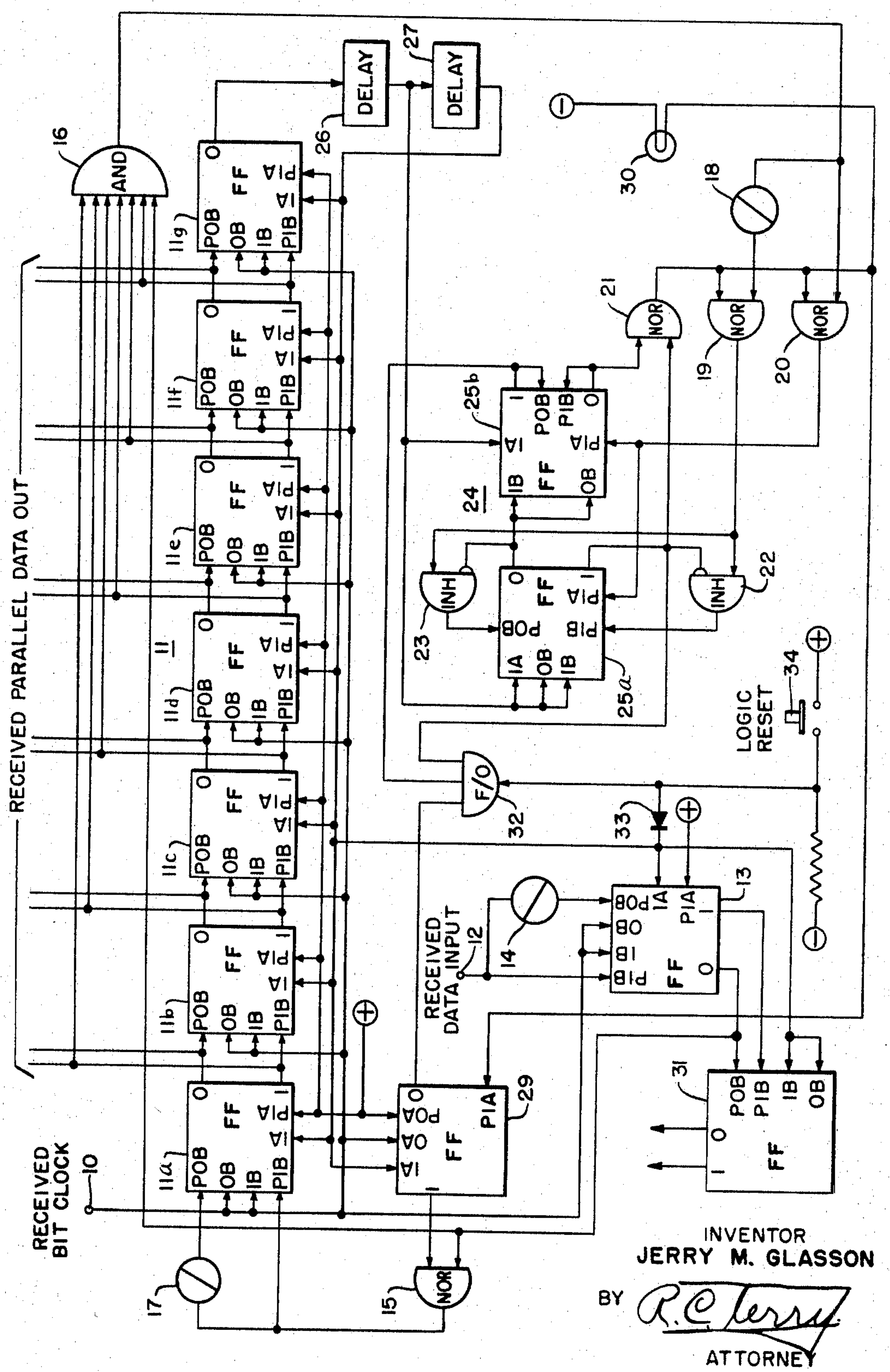
INVENTOR
JERRY M. GLASSON
BY R. C. Terry
ATTORNEY United States Patent Office 3,472,956
Patented Oct. 14, 1969

3,472,956

SYNCHRONIZING CIRCUIT FOR A RECEIVING DISTRIBUTOR

Jerry M. Glasson, Skokie, Ill., assignor to Teletype Corporation, Skokie, Ill., a corporation of Delaware Filed Nov. 2, 1965, Ser. No. 506,100
Int. Cl. H04l 7/00
U.S. Cl. 178—69.5 7 Claims

ABSTRACT OF THE DISCLOSURE

A circuit for synchronizing a receiving distributor by recognizing three successive occurrences of a predetermined synchronizing character at the beginning of each transmission, following which a synchronizing pulse is automatically inserted locally into the receiver at the beginning of each received code combination in order to maintain the synchronism of the receiving distributor during succeeding transmission of message data. The first bit of each code combination displaced by the insertion of a synchronizing bit at the receiving terminal is stored separately for later interrogation and utilization.

This invention relates to telegraph receiving distributors and more particularly to a circuit for providing character synchronization of a telegraph receiving distributor.

Telegraph systems most commonly used today utilize the well known start-stop technique for maintaining synchronization between the transmitter and receiver. Start-stop systems are not truly synchronous systems but provide reliable and accurate transmission and reception of binary telegraph data. The information content of the binary data stream at any given speed, however, is reduced by the separate start and stop bits which must be inserted for each character of information bits. Thus for the well known five-level Baudot code there are five information bits plus a start and stop bit making a total of seven bits transmitted for each character in the start-stop code. As a consequence the information density of the signal stream is not as great as it could be if the start and stop bits were eliminated.

In order to increase the information density and, therefore, the actual speed of transmission of messages without increasing the speed of transmission of the binary data, it is desirable to eliminate either or both of the start and stop bits. When this is done, however, complications arise from the fact that some means must be provided for establishing and maintaining bit and character synchronization of the receiving distributor with the incoming binary train. If synchronization of either type were to be lost, the information recorded at the receiving station of such a system would be garbled and meaningless.

When an electronic shift register is utilized as the principle component of a receiving distributor for translating the incoming serial binary train into parallel output, bit synchronization is relatively easy to obtain since synchronizing pulses for driving the shift register may be derived from transitions in the incoming binary signal train. Character or frame synchonization then may be maintained by transmitting a synchronizing bit once for each character. A problem ahises, however, in establishing proper character or frame synchronization at the commencement of data reception; so that the output of the receiving distributor shift register is sampled only when a valid character is in proper position in the shift register.

Accordingly, it is an object of this invention to provide a circuit for establishing character or frame synchronization between a receiving distributor and a received serial train of binary data bits at the beginning of reception of a telegraph message.

It is another object of this invention to provide character synchronization of a telegraph receiving distributor by counting a predetermined number of successive special framing characters transmitted at the beginning of the binary data intended for the receiver and indicating when a predetermined count is reached that the receiver is in character synchronization with the incoming binary data train.

It is a further object of this invention after character synchronization of a telegraph receiving distributor has been established to insert synchronizing bits into the incoming binary data train at the position at which an incoming synchronizing bit should occur based on the position in the signal train at which the previous synchronizing bit occurred.

It is an additional object of this invention to eliminate the necessity of synchronization bits in an incoming binary data train once initial character synchronization of a receiving distributor with the incoming binary data train is attained.

These and other objects are accomplished in a preferred embodiment of this invention which provides character or frame synchronization for a telegraph receiving distributor with an incoming serial binary data train. Synchronizing bits occur in the data train prior to the information bits constituting each character. The basic element of the receiving distributor is a shift register having sufficient capacity to store an entire character plus a synchronizing bit. Shift pulses for the shift register may be derived from the transitions in the incoming binary data stream and are delayed half a bit so that the information is shifted into the register once for each incoming bit at the center of each bit. Preceding the characters containing the message which is transmitted to the receiver, the transmitting station transmits a predetermined number of framing characters each of which constitutes all marking (1) bits preceded by a spracing (0) synchronizing bit. Initially the shift register is reset so that all of the stages store the binary condition (preferably mark or "1") which is opposite to the synchronizing bit (preferably space or "0") which precedes each framing character. Thus the first bit shifted into the shift register is the spacing synchronizing bit which is followed by the marking bits of the framing character. After this synchronizing bit is shifted to the last stage of the shift register, a framing character recognition gate detects the presence of the framing character in the register and provides an output pulse which is utilized to step a binary counter in response thereto.

The synchronizing bit stored in the last stage of the shift register causes a reset pulse to be applied to the register resetting it to the all mark condition prior to the reception of the next character. The next shift pulse then inserts the synchronizing bit for the next framing character into the first stage of the register and the above sequence is repeated. After a predetermined number of successive framing characters have been counted by the counter, an output signal is obtained from the counter indicating that the receiving distributor is in frame or character synchronization with the incoming data stream. The output of the counter also is gated with the reset pulses obtained from the last stage of the shift register once per character to trigger a synchronizing bit insert flip-flop which then inserts a synchronizing bit into the shift register input at the point where the next synchronizing bit should occur. This insures that character synchronization is maintained for the remainder of the incoming message and allows all of the incoming data bits which follow the initial framing characters to be information carrying data bits. The next shift pulse which is applied to the shift register then resets the synchronizing bit insert flip-flop, and it has no affect on the remaining data bits of the following character. At the end of each character, however, this synchronizing bit insert flip-flop is triggered as stated above to provide the next synchronizing bit for the shift register input.

Since the synchronizing bit insert flip-flop overrides the first bit of each incoming character applied to the shift register, the first bit of each incoming character is stored in a first bit storage flip-flop which is set in accordance with this first bit. This flip-flop remains set throughout reception of all of the remaining data bits of the character; so that when the inserted synchronizing bit is stored in the last stage of the shift register, the remaining stages of the shift register store the second and all following bits of the character while the first bit storage flip-flop stores the first bit of that same character. As a consequence, all of the bits of the character are stored and are available for suitable receiver utilization devices at this time. Thus, once initial character synchronization is attained by the transmission of framing characters which include a synchronizing bit, all of the remaining data bits may constitute information data bits since the character timing is provided automatically by operation of the synchronizing bit insert flip-flop.

If a character other than a framing character is received before the counter attains its predetermined count of framing characters, the counter is reset so that synchronization cannot be indicated until a framing character stored in the shift register coincides with a storing of a spacing (0) synchronization bit in the final stage of the shift register for a predetermined number of successive times.

Other objects and features of this invention will become apparent to those skilled in the art upon consideration of the following detailed specification taken in conjunction with the drawing, the single figure of which is a circuit diagram of a preferred embodiment of the invention.

Referring to the drawing it will be noted that a number of boxes labeled FF appear therein. These boxes represent flip-flop circuits of the type disclosed in FIG. 2 of United States Patent No. 3,439,332 granted to H. D. Cook on Apr. 15, 1969. The particular internal circuitry of these flip-flops forms no part of this invention and reference may be had to abovementioned Cook patent for details of their operation. However, it should be noted that these flip-flops are all of the type in which the trigger inputs must be gated with a direct current priming potential before the trigger input has any affect on the operation of the flip-flop. For convenience, the two states of the flip-flop are designated "0" and "1." The priming input for the level of the flip-flop is designated on the drawing by the letter P. The priming input which is gated with a particular trigger input is designated in the drawing by placing the same letter A or B at both the trigger and priming inputs of the flip-flop. For example, a trigger input used to set a flip-flop to its "0" state is designated on the drawing as 0B or 0A and this trigger input is gated with a priming POB or POA, respectively. The outputs of the flip-flop are labeled merely "0" or "1" with a positive output potential being obtained from the output to which the flip-flop is set and a negative potential being obtained from the other output at the same time.

In the ensuing description of the operation of the circuit shown in the figure, the terms "positive" and "negative" potential will be used to identify the relative voltages being employed in the circuit. It should be understood, however, that in actual practice such potentials need not be positive and negative but, by way of example, could as well be 0 volts and −6 volts or +6 volts and 0 volts, respectively, depending on the particular circuit components utilized. It is felt, however, that the use of the terms "positive" and "negative" will serve to clearly differentiate the relative potentials used and will facilitate an understanding of the operation of the circuit.

The receiving distributor shown in the figure is utilized to deserialize or place in parallel form the incoming serial data stream which is transmitted to the receiving station with which the circuit shown in the figure is associated. The particular circuit shown in the figure converts an incoming serial data stream to a parallel 6-level signal and also generates character timing. The bit timing for the circuit may be derived by any suitable means (not shown) from the incoming serial data stream and comprises a sequence of pulses having a frequency equal to that of the bit rate of the incoming signal with each pulse having its positive going transition occurring at the center of each of the received data bits. These received bit clock pulses are applied to an input terminal 10 and provide the basic timing for the operation of the entire circuit.

The basic element of the receiving distributor is a shift register 11 comprising seven stages **11*a* through 11*g*. Each of these stages constitutes a flip-flop of the type previously described. Initially, let it be assumed that the circuit is in its reset condition in which all of the stages of the shift register store a binary "1" thereby causing the "1" output of each stage to be positive and the "0" output to be negative. The circuit now is ready to receive information from a remote transmitter and the serial binary data stream is applied to a received data input terminal 12. The data applied to the terminal 12 is utilized to prime both inputs P1B and P0B of a one bit buffer flip-flop 13, with the data being applied directly to the P1B input of the flip-flop 13 and being inverted by an inverter 14 prior to its application to the P0B input of the flip-flop 13. For purposes of illustration assume that a binary "1" or marking bit in the received data input is represented by a positive pulse and that a binary "0" or spacing bit in the received data input is represented by a negative pulse. Thus, when a "1" is present, a positive priming potential is applied to the priming input P1B to prime that input; and when a binary "0" is present, it is inverted by the inverter 14 which causes a positive priming potential to be applied to the priming input P0B of the flip-flop 13.**

As stated previously, a received bit clock pulse is applied to the terminal 10 at the mid point of each received data input bit; and this positive clock pulse is applied in parallel to the trigger inputs 1B and 0B of the flip-flop 13. As a consequence, the flip-flop 13 is set to its "1" or its "0" state depending upon whether a positive priming potential is applied to the 1B input or the 0B input at the time the clock pulse arrives. If the received data input bit is a "1," the flip-flop 13 is set to its "1" state and its output, taken from the "0" output of the flip-flop, is a negative pulse. If the received data input pulse is a "0," the "0" output of the flip-flop 13 is a positive pulse.

Output pulses from the "0" output of the flip-flop 13 are supplied to a NOR gate 15 and to a framing character recognition AND gate 16. The second input to the NOR gate 15 is negative at this time as will be more fully described hereinafter. Since the first data bit received at the input terminal 12 should be a spacing (0) synchronizing bit, a positive output should be obtained from the "0" output of the flip-flop 13 thereby causing the output of the NOR gate 15 to be negative. The output of the NOR gate 15 is utilized to drive the shift register 11 and is applied directly to the P1B input of the flip-flop **11*a* and is inverted by an inverter 17 and applied to the P0B input of the flip-flop 11*a*. As a consequence, the negative potential applied to the P1B input of the flip-flop 11*a* has no affect on the flip-flop at this time, but the positive potential applied to the P0B input primes the flip-flop 11*a*. Upon reception of the next bit clock pulse which is applied simultaneously to the 0B and 1B trigger inputs of the flip-flop 11*a*, the flip-flop 11*a*** is set to its "0" state thereby storing the initial synchronizing bit.

As stated previously all of the other stages of the shift register 11 store "1" bits at this time. Subsequent data bits received at the input terminal 12 are stored in the flip-flop 11*a* each time a received bit clock pulse is applied to the terminal 10, with the information in the register 11 being shifted to the right since the outputs of each stage prime the corresponding inputs P1B and P0B of each succeeding stage and each bit clock pulse is applied to both trigger inputs of each stage of the shift register 11. As a consequence, after reception of the first character, the first synchronizing bit is stored in the flip-flop stage 11*g* with the six data information bits of the character being stored in the stages 11*a* through 11*f* of the register 11. Since the format of the received data input stream is chosen to begin with a sequence of framing characters in which all of the information bits are "1" preceded by a "0" synchronizing bit, the first character stored in the shift register should cause stages 11*a* through 11*f* all to be set "1" with the stage 11*g* being set "0."

When the next received data input pulse is received, it then should constitute the "0" synchronizing bit for the next character, causing the "0" output of the flip-flop 13 to be positive. This positive output of the flip-flop 13 is applied to the AND gate 16 along with the "1" outputs of the stages 11*a* through 11*f* of the register 11. If a framing character is stored in the shift register at this time, the "1" outputs of all of these stages are positive thereby causing the output of the AND gate 16 to be positive. The output of the AND gate is applied through an inverter 18 to a NOR gate 19 and also is applied directly to a NOR gate 20. At this time the other input to each of the NOR gates 19 and 20 is a negative input applied to them from the output of a NOR gate 21, as will be more fully explained subsequently. When the AND gate 16 detects a framing character, the NOR gate 19 is enabled and passes a positive pulse which is applied to a pair of inhibit gates 22 and 23. The outputs of the inhibit gates 22 and 23 are utilized to prime the inputs P1B and P0B, respectively of a flip-flop 25*a* constituting the first stage of a two stage binary counter 24 consisting of a pair of flip-flops 25*a* and 25*b*. In a similar manner the output of the NOR gate 20 is applied to the P1A priming inputs of the flip-flops 25*a* and 25*b*. Assuming that a valid framing character has been detected by the AND gate 16 the output of the NOR gate 20 is negative and has no affect upon the flip-flops 25*a* and 25*b* at this time. The counter 24 initially is reset so that both flip-flops are in their set "1" state.

At the time that the AND gate 16 detects the framing character, a positive output pulse is obtained from the "0" output of the flip-flop 11*g* since this flip-flop now is set "0" due to the fact that it stores the first synchronizing bit received in the incoming data input signal train. Prior to this time, the flip-flop 11*g* was in its "1" state due to the fact that all of the stages of the flip-flop initially were set to "1" and all of this information was shifted through stage 11*g* before the synchronizing bit was stored in that stage. The positive output pulse obtained from the "0" output of the flip-flop 11*g* is delayed by a first signal delay circuit 26, the output of which is applied to the trigger inputs 1A, 0B and 1B of flip-flop 25*a* and to the trigger input 1A of the flip-flop 25*b*.

Since the flip-flops 24 and 25 both were set to their "1" state initially, a positive output potential is obtained from the "1" output of both of these flip-flops and a negative output potential is obtained from the "0" output of these flip-flops. The positive output potential obtained from the "1" flip-flop 25*a* is applied to the inhibit input of the inhibit gate 22 thereby causing the output of that gate to be negative. The negative output from the "0" output of the flip-flop 25*a* similarly is applied to the inhibit input of the inhibit gate 23 which allows the positve potential applied to the gate 23 from the output of the NOR gate 19 to pass through the inhibit gate 23 to prime the P0B input of the flip-flop 25*a*. Thus, when the positive pulse from the output signal delay circuit 26 is applied to the 0B trigger input of the flip-flop 25*a*, the flip-flop 25*a* is driven to its set "0" state. The positive output pulse then obtained from the "0" output of the flip-flop 25*a* is applied to the 1B and 0B trigger inputs of the flip-flop 25*b*. This pulse drives the flip-flop 25*b* to its "0" state also since a positive priming potential is applied to its priming nput P0B from the "1" output of the flip-flop 25*b* at the time the trigger pulse arrives. Both flip-flops 25*a* and 25*b* then are in their set "0" state. When this occurs the inhibit gate 23 is blocked and the inhibit 22 is opened to be responsive to further output signals from the NOR gate 19.

It should be noted at this time that the enabling signals for the NOR gates 19 and 20 are derived from the NOR gate 21 when the output of the NOR gate 21 is at a negative potential. This occurs whenever either or both of the inputs to the NOR gate 21 are positive. When both flip-flops 25*a* and 25*b* are set to their "1" state, which is the initial condition of these flip-flops, a positive output is applied to the NOR gate 21 from the "1" output of the flip-flop 25*a*. After the counter 24 has stored the first count of a framing character, a positive signal is applied to the other input to the NOR gate 21 from the "0" output of the flip-flop 25*b*. This causes the output of the NOR gate 21 to remain at a negative potential enabling NOR gates 19 and 20.

After operation of the counter 24 as described above, the output pulse from the flip-flop 11*g* is delayed by a second delay circuit 27 to cause a reset pulse to be applied to the trigger input 1A of all stages of the shift register 11 and the input buffer flip-flop 13. When the reset trigger pulse is applied to the inputs 1A of the flip-flops 11*a* through 11*g* and 13, they are reset to their "1" state due to the fact that a positive priming potential constantly is applied to the P1A inputs of these flip-flops from a suitable source of positive potential. This reset trigger pulse also is applied to the trigger input 1A of a synchronizing bit flip-flop 29 but has no affect upon that flip-flop at this time since the P1A input to the flip-flop 29 has a negative potential applied to it from the output of the NOR gate 21.

If the next character in the data input signal stream is another framing character, the next received data bit is a "0" synchronizing bit followed by six successive "1" information bits of the character. When this character is shifted into the shift register, in the manner described for the previous character, with the synchronizing bit being stored in stage 11*g* and the information bits being stored in stages 11*a* through 11*f*, the AND gate 16 recognizes this framing character and provides a positive output pulse thereby causing a negative output signal to be obtained from the NOR gate 20 and causing a positive output signal to be obtained from the NOR gate 19 as stated previously. When the output pulse then is obtained from the signal delay circuit 26, it causes the flip-flop 25*a* to be set to its "1" state due to the fact that the inhibit gate 22 passes a positive priming potential to the input P1B as described previously. The flip-flop 25*b* remains in its "0" state since no trigger pulse is applied to its trigger inputs 1B and 0B at this time. As a consequence, the binary counter now stores a count indicating that two successive framing characters have been received by the circuit. The output of the NOR gate 21 remains negative due to the fact that a positive potential is applied to one of its inputs from the "1" output of the flip-flop 25*a*

Following the operation of the counter 24, a pulse is obtained from the signal delay circuit 27 which causes the shift register 11 to be reset to store "1" in all stages and which also causes the buffer flip-flop 13 to be set to its "1" state as described previously. If the next character is a framing character, the above sequence of operation is repeated; and at the end of the character, a pulse is obtained from the signal delay circuit 26 to cause the binary counter consisting of the flip-flops 25*a* and 25*b* to advance one more count, counting third framing character.

When this occurs, the flip-flop 25*a* is again set to its "0" state.

The flip-flop 25*b* then is set to its "1" state by the output pulse from the "0" output of the flip-flop 25*a* thereby causing both inputs to the NOR gate 21 to be negative since the "1" output of the flip-flop 25*a* and the "0" output of the flip-flop 25*b* are negative at this time. consequently, the output of the NOR gate 21 rises to a positive potential thereby blocking both NOR gates 19 and 20 causing their outputs to remain at a negative potential. At the same time, the positive output of the NOR gate 21 is applied through a lamp 30 to a source of negative potential thereby lighting the lamp indicating that the receiving distributor is in frame or character synchronization with the incoming data signals. The positive output of the NOR gate 21 also is applied to the priming input P1A of the synchronizing bit insert flip-flop 29.

Following this final operation of the counter 24, an output pulse is obtained from the output of the signal delay circuit 27, in the manner previously described, to reset all stages of the shift register 11 and the flip-flop 13 to the state "1." This time, however, the output pulse from the signal delay 27 also sets the flip-flop 29 to its "1" state since the pulse is applied to the trigger input 1A of the flip-flop which now has been primed by the positive potential applied to the priming input P1A. As a consequence, a positive output signal is applied from the "1" output of the flip-flop 29 to the NOR gate 15 thereby forcing the output of the NOR gate 15 to be negative indicating a "0" signal to the input stage 11*a* of the shift register 11. This signal overrides the "0" output of the one bit buffer flip-flop 13 and causes a synchronous "0" bit to be inserted into the signal stream at this time irrespective of what the "0" output of the flip-flop 13 may be.

The next bit clock pulse received at the input terminal 10 causes this "0" bit to be stored in the flip-flop 11*a* in the manner previously described. This clock pulse also resets the synchronizing bit insert flip-flop 29 to its "0" state by the application of a trigger pulse to the trigger 0A which is permanently primed from a source of positive potential which is applied to the priming input P0A of the flip-flop 29. As a consequence, the "1" output of the flip-flop now goes negative enabling the NOR gate 15 allowing it to sense the data input signals applied to it from the output of the buffer flip-flop 13.

During the reception of normal information bits, spacing or "0" bits occur at random intervals throughout the data input stream. Since all of the stages of the shift register 11 are set to state "1" at the end of each of the framing characters, an output is obtained from the final stage 11*g* only when the actual or inserted synchronizing "0" bit is stored in that stage. After being delayed by the delay circuits 26 and 27, this output pulse resets all of the stages of the register 11 to state "1" thereby preventing an output pulse from occurring until the next synchronizing bit reaches stage 11*g* of the register. At the end of each character this reset pulse also causes the flip-flop 29 to be set to its "1" state in the manner discussed previously thereby forcing the insertion of a "0" synchronizing bit at the beginning of each character applied to the shift register 11. As stated previously, the first bit clock pulse recieved following this reset pulse from the signal delay circuit 27 causes the flip-flop 29 to be set to its "0" state.

Just prior to occurrence of the reset pulse from the output of the signal delay circuit 27, the first bit of the next succeeding character is stored in the "1" bit buffer flip-flop 13. This was caused by the application of the receiving bit clock pulse which also caused the "0" synchronizing bit to be shifted into stage 11*g* of the shift register 11. The reset pulse from the signal delay circuit 27 which causes the shift register to be reset to store a "1" in all stages also is applied to the trigger inputs 1B and 0B of a first bit storage flip-flop 31. The priming inputs P1B and P0B of the flip-flop 31 are obtained from the "1" and "0" outputs, respectively, of the buffer flip-flop 13. For example, if the buffer flip-flop 13 is storing a binary "1" at this time, the P1B input of the flip-flop 31 is primed; and when the reset pulse is applied to the 1B input of the flip-flop 31, it is set to its "1" state thereby storing the first bit of the character then being received. This occurs simultaneously with the setting of the synchronizing bit insert flip-flop 29 to its "1" state as described previously.

When the next received bit clock pulse occurs shortly thereafter, the "0" synchronization bit inserted by the flip-flop 29 is stored in stage 11*a* of the shift register, as described previously, thereby overriding this first bit of the character obtained from the output of the flip-flop 13. This first bit however now is stored in the flip-flop 31 and remains stored in this flip-flop throughout the reception of the character since no additional trigger pulses are applied to the inputs 1B and 0B of the flip-flop 31 until the next reset pulse occurs from the output of the signal delay circuit 27 at the end of reception of the character. As a consequence, when the inserted synchronizing "0" bit is shifted into stage 11*g* of the shift register 11, the remaining stages 11*a* through 11*f* of the shift register store the second through the seventh data bits for the character; and the first bit storage flip-flop 31 stores the first data bit of that same character. Thus, once initial synchronization of the circuit is obtained by the framing characters transmitted at the beginning of the message, it no longer is necessary to insert synchronizing bits into the incoming data stream and all of the data bits received by the system may be information data bits which are recovered from the outputs of the flip-flop 31 and the stages 11*a* through 11F. Character synchronization for allowing each character to be read out of the distributor or to be supplied to suitable utilization apparatus at the proper time is provided by the operation of the synchronizing bit flip-flop 29 and no longer depends upon a special signal format in the received data input.

It is apparent that in order to sustain the foregoing sequence of operation for maintaining synchronization of the receiving distributor once it has been obtained by counting the framing characters, it is necessary to hold the binary counter 24 at the count attained after three consecutive framing characters have been received in order that the output of the NOR gate 21 remains at a positive potential. The output trigger pulses from the signal delay circuit 26 continue to be applied to the binary counter once for each character of the message. However, none of the priming inputs to the flip-flops 25*a* and 26*b* have a positive potential applied to them once the predetermined count of three framing characters has been attained, since the outputs of the NOR gates 19 and 20 are held to a negative potential due to the fact that the positive output from the NOR gate 21 is applied to the inputs of both NOR gates 19 and 20. As a result, trigger pulses applied to the counter after three successive framing characters have been counted have no further affect on the operation of the system.

In order to reset the system prior to the receipt of a new message, it is necessary to operate momentarily the logic reset button 34. When this is done, a positive potential is applied through a conventional diode fan-out gate 32. The output of the fan-out gate 32 is applied to the "1" output terminals of each of the flip-flops 25*a* and 25*b* causing these flip-flops to be forced to their "1" state. Such a triggering technique is well known in the art and will not be further discussed here. As an alternative, an additional triggering input with a corresponding permanently primed priming input could be provided for each of the flip-flops 25*a* and 25*b* for receiving the reset pulse obtined by operation of the reset button 34. As a result of the pulses obtained from the fan-out gate 32, the binary counter is reset with both flip-flops 25*a* and 25*b* being set to their "1" state. The logic reset pulse obtained by momentary operation of the button 34 also is utilized to reset all of the stages of the shift register 11 to their state "1" by application of a trigger pulse to the trigger inputs 1A of flip-flops 11a through 11g. The output of the fan-out gate 32 also is applied to the "0" output of the flip-flop 29 forcing it to its set "0" state. A diode 33 is provided to prevent the reset pulses obtained from the output of the delay circuit 27 from being applied to the input of the fan-out gate 32.

The foregoing discussion has been concerned with operation of the character or frame synchronization and synchronizing bit insertion circuit under ideal conditions in which the characters first received by the system were proper framing characters and no spurious triggering of the system took place during the character synchronization cycle. In the event, however, that the received data input stream does not include a sequence of framing characters at its beginning, or that distortion transforms framing characters into some other character, provision must be made for preventing an indication of synchronization when such character synchronization has not in fact occurred. As stated previously, at the time when the first character is stored in the shift register 11, a synchronizing "0" bit is stored in the stage 11g causing a delayed output signal to be applied to the trigger inputs of the counter flip-flops 25a and 25b. If a framing character is not stored in the shift register 11 at this time, or if a synchronizing bit is not obtained from the "0" output of the flip-flop 13 at this time, the AND gate 16 has a negative output signal. This negative signal then causes the NOR gate 20 to provide a positive priming signal to the priming inputs P1A of both flip-flops 25a and 25b. When the trigger pulse from the signal delay circuit 26 then is applied to the trigger inputs 1A of the flip-flops 25a and 25b, they both are reset to state "1" which is the initial or reset condition of the counter. This reset can occur at any time in the counting sequence until the NOR gate 20 is blocked by a positive output from the NOR gate 21, which event only occurs after three consecutive framing characters have been received and detected by the AND gate 16 and counted by the binary counter 24. As a consequence, the system is protected against providing an erroneous indication of synchronization and only indicates synchronization after three consecutive framing characters have been received in synchronization.

It should be noted that the parallel deserialized output of the shift register 11 and the first bit storage flip-flop 31 may be sampled by the output pulse obtained at the output of the delay circuit 26 in order to transfer the information from the shift register and the storage flip-flop to suitable receiving apparatus (not shown). Provision may be made for inhibiting such a sample until after the counter 24 indicates the desired count of three successive framing characters. Implementation of this feature may be accomplished simply by gating the output of the NOR gate 21 with the output of the delay circuit 26 to provide a sample pulse which then may be gated with the parallel output from the stages 11a through 11f of the shift register and the output of the first bit storage flip-flop 31 to provide the desired parallel signal to the receiving apparatus. Such a feature forms no part of the preferred embodiment of this invention and for that reason has not been shown in the drawing.

It should be noted that while the previous description has been directed to a system using a seven-stage shift register and a first bit storage flip-flop for a seven-level code, the number of information bits in each character and, hence, the number of stages in the shift register may be varied to fit any permutation binary code without changing the operation of the circuit.

The foregoing description has been limited to a specific embodiment of this invention. However, various modifications will occur to those skilled in the art and the invention is not to be considered limited to the embodiment chosen for purposes of disclosure, and covers all changes and modifications which do not constitute departures from the true scope of the invention.

What is claimed is:

1. A system for character synchronizing a telegraph receiving distributor with a binary signal train, the signals of which are arranged in permutation code into characters including, means for temporarily storing the received signals and having a capacity of at least one character;

means for detecting the presence of at least one predetermined character in the storing means;

counting means responsive to the output of the detecting means for providing an output after counting a predetermined number of successive detected characters;

means responsive to the output of the counting means for indicating that the receiving distributor is in character synchronization with the incoming binary signal train and for inserting a synchronization bit into each succeeding character received by the receiving distributor.

2. A system according to claim 1 having means for resetting the counter whenever a character other than one which is detected by the detecting means is received prior to the time the predetermined number of characters is counted.

3. A system according to claim 2 having means responsive to the output of the counting means for rendering the counting means nonresponsive to further outputs from the detecting means.

4. In a system for providing character synchronization in a telegraph receiving distributor in which binary data bits are received seriatim, the data bits being arranged into permutation coded characters, each comprising a predetermined number of data bits;

means for temporarily storing at least a sufficient number of data bits to constitute one character;

means for detecting the presence of a predetermined character whenever that character is stored in the storing means;

counting means responsive to the output of the detecting means for providing an output signal after counting a predetermined number of consecutive detected characters; and means responsive to the output of the counting means for inserting a synchronization bit into each succeeding character received by the distributor.

5. A system according to claim 4 wherein the predetermined character is a special framing character and the counting means is reset whenever a character other than a framing character is received prior to receipt of the predetermined number of successive framing characters.

6. A system according to claim 4 having a second storing means for storing the data bit which is being received at the time a synchronizing bit is inserted into a character.

7. A system according to claim 6 wherein the second storing means holds each data bit stored therein for a period of time equal in length to the duration of one character.

References Cited

UNITED STATES PATENTS

| | | | |
|---|---|---|---|
| 3,159,812 | 12/1964 | Engel | 340—146.1 |
| 3,245,040 | 4/1966 | Burdett et al. | 340—172.5 |

ROBERT L. GRIFFIN, Primary Examiner

R. L. RICHARDSON, Assistant Examiner